United States Patent Office 2,828,335
Patented Mar. 25, 1958

2,828,335

HYDROGENATION OF PHTHALIC ACID SALTS

Louis L. Ferstandig, El Cerrito, and William A. Pryor, Richmond, Calif., assignors to California Research Corporation, San Francisco, Calif., a corporation of Delaware No Drawing. Application November 22, 1955
Serial No. 548,544

5 Claims. (Cl. 260—514)

This invention is concerned with a method for hydrogenating salts of a phthalic acid to produce salts of the corresponding hexahydrophthalic acid. The salts can be employed in the preparation of polymers for use in plastics and the like and represent a valuable source of hexahydrophthalic acid by acidification of the salt to liberate the hexahydrophthalic acid in accordance with methods familiar to those skilled in the art. Hexahydrophthalic acids can be used in the manufacture of polymers, including polyesters or polyamides, for use in plastics and plasticizers, and resins for surface coatings. Because of the difficulty of preparation, however, these compounds are expensive, and a method for hydrogenating the aromatic nucleus of these compounds in a relatively simple and quantitative manner would provide a most advantageous source of hexahydrophthalic acids and derivatives. However, prior art attempts at such hydrogenation have produced yields too low for practical or economical utilization of the methods employed.

Attempts to hydrogenate phthalic acids using free hydrogen and catalysts of various metals, metal oxides, or other metal compounds, including catalysts containing plantinum, chromium, nickel, cobalt, copper, and zinc have demonstrated that such hydrogenation results not only in saturation of the ring, but also in extensive decarboxylation. Thus, the product material has a high content of cyclohexane and cyclohexane monocarboxylic acids and a comparatively low content of the desired hexahydrophthalic acids. Moreover, the use of an aqueous solution of phthalic acid as a potentially desirable hydrogenation medium, water being both inexpensive and inert to hydrogenation, has a major disadvantage arising from the slight aqueous solubility of phthalic acids. Use of the more water-soluble salts of such acids to enhance the phthalic concentrations has either resulted in failure to hydrogenate the aromatic ring or has necessitated the use of increased temperatures for hydrogenation with the result that thermal decarboxylation becomes a major cause of decreased yields of hexahydrophthalic acid salts.

Hydrogenation of esters of phthalic acids has also been proposed. However, this approach involves appreciable expense and considerable product loss both in initially esterifying a phthalic acid feed material and in subsequently converting the ester to the desired acid or salt form.

This invention contemplates broadly contacting a feed material containing salts of phthalic acid dispersed in a suitable solvent, e. g., water, with a gas containing free hydrogen in the presence of a catalyst containing ruthenium so as to saturate the aromatic nucleus without appreciable loss of the carboxyl groupings, thereby achieving essentially quantitative yields of the corresponding hexahydrophthalic acid salts. The salts may then be recovered from solution and purified, or, if desired, converted to the corresponding hexahydrophthalic acids. In forming the dispersion of the feed material, including true solutions, suspensions and the like, a non-aqueous medium may be used such as ethanol, methanol, acetic acid, or the like, an aqueous medium being preferred because of its low cost, its essentially inert nature toward both the phthalic solute and of the hydrogen gas, and its ability to contain appreciable concentrations of the salts, thereby increasing the potential rate of hydrogenation.

It has also been found that slurries containing a saturated aqueous solution of the salt together with excess solid salt may be effectively hydrogenated by the process of this invention to give essentially quantitative yields of the corresponding hexahydrophthalic salts. Small amounts of impurities in the phthalic feed material, i. e., less than 1 weight percent, such as sulfur, nitrogen, iron and chromium, have been observed to have no deleterious effect on the hydrogenation reaction.

Metallic ruthenium, oxides of ruthenium or salts containing ruthenium in either the anion or cation can be successfully employed, ruthenium dioxide being especially advantageous in achieving high yields of the hydrogenated diacid product. In many instances, the initial hydrogenation will produce reduced ruthenium metal regardless of the chemical combination in which the ruthenium was originally present; in such instances, the reduced metal acts as a highly effective catalyst. Accordingly, the particular chemical form in which the ruthenium is introduced may be appreciably determined by the relative ease of handling prior to hydrogenation. Since catalysis is primarily a surface phenomenon, the ruthenium catalyst may advantageously be deposited on a supporting material according to procedures well known in the art, so as to present a maximum of catalytically active surface area for the amount of ruthenium used. Catalysts in the form of fine powders dispersed through a liquid product being hydrogenated also present a high catalytic surface area, and powdered or granulated ruthenium dioxide has proved an especially advantageous catalyst for the practice of this invention. In the use of such dispersed catalysts, the material being hydrogenated should be continuously agitated to assure uniform distribution of the catalyst. Although the amount of catalyst is not critical other than to affect the rate of hydrogenation, amounts of 0.01–5 weight percent of ruthenium are generally preferred.

The ruthenium compounds used in this invention have been found to be highly active hydrogenation catalysts, even at low temperatures. This is especially advantageous in that thermal decarboxylation is minimized, thereby greatly increasing the yield of hexhydrophthalic diacid salts. Temperatures may be employed in the range from atmospheric to 250° C., but a value in the range 25° to 150° C. is preferred.

The hydrogen pressure is not critical and may be selected, generally from within the range of atmospheric to 5000 p. s. i. and higher, according to the rate of hydrogenation desired in view of the particular apparatus and reaction conditions being employed.

The time required for essentially complete hydrogenation varies with the conditions and feed materials employed, generally a period in the range 0.5 to 20 hours being sufficient.

The hydrogenation method of this invention is found to result in essentially quantitative yields of the salts of the hydrogenated phthalic acids. Such results indicate the marked superiority of this invention over methods used in the prior art, wherein hydrogenation of phthalic acid salts was difficult or impossible, at least without the use of such high temperatures as to give extensive thermal decarboxylation.

Following production of the hexahydrophthalic acid salts, the catalyst may be separated from the reaction product, as by filtration, and the salt may be recovered and purified from the aqueous solution, if desired, by means well known to those skilled in the art. Such methods include distillation of the solvent, fractional crystallization, salting out, extraction, adsorption, or the like. The salt product may be simply converted to the corresponding hexahydrophthalic acid by acidification, as with a mineral acid, and the free hexahydrophthalic acid recovered, as by cooling and filtering to remove the precipitated acid. The recovered acid may be further purified, if desired, as by recrystallization from water or by ether extraction followed by evaporation of the ether.

The term "phthalic acid" as used in this specification and claims is intended to include all phthalic acid isomers, wherein one acid grouping may be in the ortho-, meta- or para-position relative to the other acid grouping on the aromatic ring.

This invention is further illustrated by the following examples.

*Example 1*

The equipment used for hydrogenation consists essentially of an autoclave equipped with a rocker mechanism to enable constant agitation of the contents. The autoclave is equipped with a pressure gauge and a gas inlet mechanism permitting the introduction of hydrogen to desired pressures while the autoclave is being agitated at controlled elevated temperatures. In each example an initial hydrogen pressure of about 1000 pounds per square inch is used in the autoclave and hydrogen gas is thereafter added at intervals during the subsequent course of reaction so that the hydrogen pressure remains within the range 600 to 1300 p. s. i. at all times. The completion of hydrogenation is indicated in each experiment by the attainment of a constant pressure in the autoclave.

A saturated solution of sodium isophthalate in water is prepared by dissolving 142 g. of isophthalic acid (0.86 mol, 1.72 equivalents) in 200 cc. of water containing 69 g. of sodium hydroxide (1.72 equivalents). To this solution is added 1.2 g. of powdered ruthenium dioxide and the resultant mixture is charged to the autoclave described above. During hydrogenation, the autoclave is maintained at a temperature of 110° C. for 6 hours. Upon cooling and bleeding of the excess hydrogen, the liquid product is filtered to remove the catalyst and the filtrate acidified to a pH of about 1, using hydrochloric acid. The solution is then evaporated to dryness and the solid product recrystallized from water to yield 130 grams of hexahydroisophthalic acid (88 mol percent yield) having an acid number of 645 (theoretical 652).

*Example 2*

Example 1 is repeated except that sponge nickel as the catalyst in place of ruthenium dioxide, a reaction temperature between about 100°–150° C. and a pressure of 1500 p. s. i. g., are employed. No reduction of the isophthalate salt is noted, indicating that the nickel, a well known hydrogenation catalyst, is ineffective to reduce phthalic acid salts.

*Example 3*

To the autoclave of Example 1 there are charged 36 g. of isophthalic acid dispersed in 350 g. of water, and 0.30 g. of powdered ruthenium dioxide. During hydrogenation the temperature is maintained at 110° C. for about 2 hours after which a constant pressure is noted. After reaction the bomb is cooled, excess hydrogen bled off, and the product separated from the catalyst. An acid number determination of the product gives a value of about 600 (theoretical 652), indicating that substantial decarboxylation of the acid occurs during reaction.

*Example 4*

The above experiment of Example 3 is repeated with the exception that prior to hydrogenation there are added 0.44 equivalent of NaOH to the dispersion of water and acid, bringing the pH of the resulting mixture to 8. Following reaction the product is then worked up as in Example 1. The yield of hexahydroisophthalic acid is 92%, and the acid number, 652 (theoretical 652).

*Example 5*

To the autoclave of Example 1 there are charged 25 g. of terephthalic acid, 0.15 g. of ruthenium dioxide and 100 ml. of glacial acetic acid. Hydrogenation is effected according to the procedure of Example 1 at a temperature of 150° C. for 6 hours under a pressure of about 1000 p. s. i. g. After reaction the product is worked up as in Example 1. There is obtained only a 60% yield of hexahydroterephthalic acid, the remainder being largely cyclohexane carboxylic acid.

*Example 6*

Using the procedure described in Example 1, but substituting a catalyst of finely divided ruthenium metal in place of ruthenium dioxide, similar results are obtained.

*Example 7*

To a slurry of 156 g. of sodium isophthalate in 210 g. of water is added 1.01 g. of black granular ruthenium oxide and the resultant mixture is charged to the autoclave described in Example 1. During hydrogenation the autoclave is maintained at a temperature of 110° C. for 4.7 hours. Following hydrogenation, the solution of hexahydroisophthalic salt is removed from the bomb and filtered to remove the ruhtenism catalyst. Hexahydroisophthalic acid is precipitated by adding enough hydrochloric acid to give a pH of 1. The solution is cooled to 0° C. and filtered and then dried. A continuous ether extraction is performed on the filtered solid to extract the hexahydroisophthalic acid. Removal of the ether yields 115 g. of the acid (90 mol percent yield) having an acid number of 652 (theoretical 652).

*Example 8*

To a feed stock of 58 g. of sodium isophthalate in 350 cc. of water containing the following impurities:

| | |
|---|---|
| Sulphur, weight percent | 0.011 |
| Nitrogen, weight percent | 0.015 |
| Iron, p. p. m. | 13 |
| Chromium, p. p. m. | 31 |
| Terephthalic acid, weight percent | Less than 1 | is added 0.30 g. of black granular ruthenium dioxide and the resultant mixture is charged to the autoclave described in Example 1. During hydrogenation the autoclave is maintained at a temperature of 110° C. for 4 hours. Following hydrogenation, the product is filtered to remove the ruthenium catalyst. Hexahydroisophthalic acid is precipitated by adding hydrochloric acid to give a pH of 1. The solution is cooled and filtered and a continuous ether extraction is performed on the filtered solid to extract the hexahydroisophthalic acid. Distillation of the ether yields 42.7 g. of the acid (90 mol percent yield) having an acid number of 652 (theoretical 652).

*Example 9*

To 108 g. of sodium terephthalate and 325 cc. of water is added 0.83 g. of ruthenium dioxide in black granular form and the resultant mixture is charged to the autoclave described in Example 1. During hydrogenation the autoclave is maintained at a temperature of 110° C. for 3 hours. Following hydrogenation, the solution of hexahydroterephthalic salt is removed from the bomb and filtered to remove the ruthenium catalyst. Hexahydroterephthalic acid is precipitated by adding hydrochloric acid to give a pH of 1. The solution is cooled and filtered and a continuous ether extraction is performed on the filtered solid to extract the hexahydroterephthalic acid. Distillation of the ether yields 80.5 g. of the acid (91 mol percent yield) having an acid number of 651 (theoretical 652).

Example 10

Using the procedure described in Example 9, but substituting a catalyst of ruthenium on an alumina support, similar results are obtained.

Example 11

To 200 g. of an aqueous solution containing 84 g. of ammonium isophthalate is added 0.18 g. of ruthenium dioxide. The mixture is charged to the autoclave and maintained at 110° C. for 24 hours during hydrogenation. Following hydrogenation the autoclave is depressurized and the reaction mixture is cooled and filtered to remove the catalyst. The mixture is then acidified with hydrochloric acid to precipitate crude hexahydroisophthalic acid, and filtered. The solid is dried and extraction with ether results in a 90% yield of hexahydroisophthalic acid having an acid number of 652 (theoretical 652).

Example 12

When Example 11 is repeated employing rhodium on alumina in place of ruthenium oxide as the catalyst, no reduction of the ammonium salt occurs.

Example 13

36 g. of isophthalic acid, 17.5 g. of sodium hydroxide, 0.30 g. of ruthenium dioxide, and 350 ml. water are charged to the autoclave. The resulting solution of sodium isophthalate has a pH of 8. The reactor is slowly heated from 24 to 46° C. over a period of 6 hours at which point the pressure becomes constant. The reactor is cooled, the hydrogen pressure bled off, and the solution filtered to remove catalyst. The solution is then concentrated to 100 ml., acidified with HCl and filtered. Three recrystallizations from water gives 78 mol percent yield of hexahydroisophthalic acid having an acid number of 652.

Example 14

Example 1 is repeated using a solution of sodium orthophthalate in place of isophthalate. Similar treatment gives a 96 mol percent yield of hexahydrophthalic acid having an acid number of 648.

Obviously many modifications and variations of the invention, as hereinbefore set forth, may be made without departing from the spirit and scope thereof and, therefore, only such limitations should be imposed as are indicated in the appended claims.

We claim:

1. A process for the preparation of hexahydrophthalic acid salts, which comprises subjecting a dispersion of phthalic acid salts to contact with a gas containing elemental hydrogen in the presence of a ruthenium catalyst, said phthalic acid salts being selected from the group consisting of ammonium salts, alkali metal salts and alkaline earth metal salts of phthalic acid.

2. The process as set forth in claim 1, wherein said ruthenium catalyst is formed in situ from ruthenium dioxide.

3. The process as set forth in claim 1, wherein said ruthenium catalyst is ruthenium metal.

4. A process for the preparation of hexahydrophthalic acid salts, which comprises subjecting an aqeous dispersion of salts of phthalic acid to contact with elemental hydrogen at a pressure in the range from atmospheric to 5000 pounds per square inch in the presence of a ruthenium catalyst, said salts of phthalic acid being selected from the group consisting of ammonium salts, alkali metal salts and alkaline earth metal salts of phthalic acid.

5. A process for the preparation of hexahydrophthalic acid salts, which comprises subjecting an aqueous solution of salts of phthalic acid to contact with a gas containing elemental hydrogen at a temperature in the range from atmospheric to 250° C. in the presence of a ruthenium catalyst, said salts of phthalic acid being selected from the group consisting of ammonium salts, alkali metal salts and alkaline earth metal salts of phthalic acid.

References Cited in the file of this patent

UNITED STATES PATENTS

| | | |
|---|---|---|
| 1,877,991 | Schwenk et al. | Sept. 20, 1932 |
| 2,675,390 | Rosenblatt | Apr. 13, 1954 |

OTHER REFERENCES

Ellis: "Hydrogenation of Organic Substances," 1930, third edition, p. 87.

Barkdoll et al.: Chemical Abstracts, vol. 48, 1954, p. 2618b.